(12) United States Patent
Liu et al.

(10) Patent No.: US 11,838,073 B2
(45) Date of Patent: Dec. 5, 2023

(54) BRIDGING TRANSMISSION DEVICE FOR UNDERWATER WIRELESS SIGNALS

(71) Applicant: DIVEVOLK (ZHUHAI) INTELLIGENCE TECH CO. LTD., Guangdong (CN)

(72) Inventors: Songdong Liu, Guangdong (CN); Jingsong Liu, Guangdong (CN)

(*) Notice: Subject to any disclaimer, the term of this patent is extended or adjusted under 35 U.S.C. 154(b) by 22 days.

(21) Appl. No.: 17/857,092

(22) Filed: Jul. 4, 2022

(65) Prior Publication Data

US 2023/0216539 A1 Jul. 6, 2023

(30) Foreign Application Priority Data

Dec. 31, 2021 (CN) .......................... 202111671569.7

(51) Int. Cl.
| | | |
|---|---|---|
| *H04B 3/50* | (2006.01) | |
| *H01B 11/18* | (2006.01) | |
| *H02G 15/02* | (2006.01) | |
| *H02G 15/04* | (2006.01) | |
| *H01R 12/53* | (2011.01) | |

(52) U.S. Cl.
CPC ........... *H04B 3/50* (2013.01); *H01B 11/1895* (2013.01); *H02G 15/025* (2013.01); *H02G 15/043* (2013.01); *H01R 12/53* (2013.01)

(58) Field of Classification Search
CPC ........ H04B 3/50; H04B 11/1895; H04B 3/54; H04B 13/02; H04B 2001/3894; H02G 15/025; H02G 15/043; H01R 12/53; H01Q 5/00; H01Q 5/40; H01Q 5/45; H01Q 5/47; H01Q 13/00; H01Q 13/06; H01Q 13/08; H01Q 13/10

USPC .......................................... 375/218, 257, 258
See application file for complete search history.

(56) References Cited

U.S. PATENT DOCUMENTS

| | | | | |
|---|---|---|---|---|
| 3,867,710 A | * | 2/1975 | Busignies | .............. H04B 13/02 343/709 |
| 4,458,248 A | * | 7/1984 | Lyasko | .................... H01Q 1/04 343/788 |
| 4,829,310 A | * | 5/1989 | Losee | ...................... H01Q 7/00 343/847 |
| 4,992,786 A | * | 2/1991 | Kirkland | ................ H04B 13/02 114/221 A |
| 5,007,697 A | * | 4/1991 | Chadha | ................ H04B 5/0018 385/24 |
| 5,315,561 A | * | 5/1994 | Grossi | ................ G01S 13/0209 367/1 |

(Continued)

*Primary Examiner* — James M Perez

(57) ABSTRACT

The present invention relates to the technical field of underwater communications, and discloses a bridging transmission device for underwater wireless signals, which includes a coaxial cable and two conversion assemblies. The coaxial cable can transmit the weak electric signal. The transmission device transmits and converts wireless signals by means of signal bridging between two or among more independent intelligent terminal devices, converts the electromagnetic wave signal and the weak electric signal to each other through two groups of conversion antennas, and transmits the weak electric signal under water through the coaxial cable, so the purpose of the remote transmission of underwater wireless signals can be achieved. The conversion assembly has no need to be wired to the intelligent terminal device through an interface, so the waterproof performance is good, and the universality is high.

10 Claims, 5 Drawing Sheets

(56) References Cited

U.S. PATENT DOCUMENTS

| | | | | |
|---|---|---|---|---|
| 5,570,688 | A * | 11/1996 | Cochran | B63C 11/32 128/201.27 |
| 5,592,156 | A * | 1/1997 | James | H04B 13/02 367/134 |
| 5,886,661 | A * | 3/1999 | Harrison | H01Q 1/04 342/28 |
| 6,058,071 | A * | 5/2000 | Woodall | H04B 13/02 367/134 |
| 6,556,297 | B1 * | 4/2003 | Cappiello | G02B 27/126 356/328 |
| 7,826,794 | B2 * | 11/2010 | Rhodes | H04B 13/02 455/99 |
| 8,577,288 | B2 * | 11/2013 | Rhodes | H01F 38/14 367/133 |
| 9,213,077 | B2 * | 12/2015 | Kieffer | B63B 22/00 |
| 9,698,463 | B2 * | 7/2017 | Wild | H01P 5/04 |
| 9,705,186 | B1 * | 7/2017 | Lozada-Ortiz | H01Q 1/50 |
| 10,629,392 | B2 * | 4/2020 | Liu | H01H 13/06 |
| 10,761,628 | B2 * | 9/2020 | Liu | A45C 11/00 |
| 2002/0037054 | A1 * | 3/2002 | Schurig | H04B 3/542 375/257 |
| 2002/0081081 | A1 * | 6/2002 | Spagnoletti | H02G 15/14 385/100 |
| 2004/0008579 | A1 * | 1/2004 | Olivier | H04B 3/36 367/19 |
| 2004/0022129 | A1 * | 2/2004 | McGeever, Jr. | G01S 19/14 367/128 |
| 2005/0088916 | A1 * | 4/2005 | Zhu | H04B 13/02 367/134 |
| 2007/0135044 | A1 * | 6/2007 | Rhodes | H04B 13/02 455/40 |
| 2007/0146219 | A1 * | 6/2007 | Rhodes | H01Q 1/34 343/709 |
| 2008/0171512 | A1 * | 7/2008 | Jack | H04B 5/02 455/41.1 |
| 2008/0300742 | A1 * | 12/2008 | Weaver | G05D 1/0038 114/312 |
| 2011/0058814 | A1 * | 3/2011 | Camilli | H04B 10/272 398/104 |
| 2011/0162573 | A1 * | 7/2011 | Race | H01Q 1/04 114/328 |
| 2012/0222997 | A1 * | 9/2012 | Potucek | H02J 50/10 307/104 |
| 2015/0084809 | A1 * | 3/2015 | Flasza | G01F 23/284 342/124 |
| 2016/0028441 | A1 * | 1/2016 | Lee | H04W 84/005 375/257 |
| 2016/0030967 | A1 * | 2/2016 | Ayer | B05B 17/08 239/16 |
| 2017/0222385 | A1 * | 8/2017 | Favie | B63B 22/00 |
| 2018/0006506 | A1 * | 1/2018 | Baer | H02J 50/12 |
| 2018/0082578 | A1 * | 3/2018 | Baiden | G01J 1/0271 |
| 2018/0123232 | A1 * | 5/2018 | Shope | H01Q 1/04 |
| 2019/0252812 | A1 * | 8/2019 | Chung | H01R 13/6275 |
| 2019/0313547 | A1 * | 10/2019 | Grassi | H02G 15/14 |
| 2020/0088813 | A1 * | 3/2020 | Gerginov | G01R 33/26 |
| 2021/0075520 | A1 * | 3/2021 | Soto | H04L 12/2898 |
| 2021/0265865 | A1 * | 8/2021 | Potucek | H01F 27/04 |
| 2021/0336319 | A1 * | 10/2021 | Gordon | H10N 69/00 |
| 2021/0399579 | A1 * | 12/2021 | Renken | H02G 3/22 |
| 2022/0163748 | A1 * | 5/2022 | Erlendsson | G02B 6/4494 |
| 2022/0321241 | A1 * | 10/2022 | Bennett | H01P 3/16 |
| 2023/0014791 | A1 * | 1/2023 | Tinnea | C23F 13/04 |
| 2023/0208473 | A1 * | 6/2023 | Rachman | H04B 3/54 375/257 |
| 2023/0216539 | A1 * | 7/2023 | Liu | H02G 15/043 375/257 |

* cited by examiner ably connected with the waterproof protection shells, and electrically connected with the conversion antennas respectively. The coaxial cable can transmit the weak electric signal.

BRIDGING TRANSMISSION DEVICE FOR UNDERWATER WIRELESS SIGNALS

TECHNICAL FIELD

The present invention relates to the technical field of underwater communications, and in particular to a bridging transmission device for underwater wireless signals.

BACKGROUND

With the increase of underwater leisure sports, sports competition and scientific popularization and other underwater activities, and with the wide application of various intelligent terminal devices in life and all walks of life, people begin to consider the use of intelligent terminal devices for underwater communications (such as the transmission of pictures, videos and other information signals). In the related art, an underwater information communication mode is sonar communication (low-frequency vibration wave or ultrasonic wave, etc.). Such a communication mode has the problems and shortcomings of high power consumption, high cost and low information transmission rate. Another underwater communication mode is cable transmission. In such a communication mode, a cable is connected to an intelligent terminal device through an interface. In the underwater environment, the waterproof technology at the joint of the intelligent terminal device and the cable is difficult and costly. Because of the inconsistent interface standards, the universality of the cable transmission is low. Moreover, the cable requires continuous power supply from the intelligent terminal device, which is prone to a risk of leakage in the underwater environment.

Water in nature (rivers, lakes, oceans and other water environments), containing a lot of electrolytes, is a conductor and has a strong ability to absorb electromagnetic waves (including various electromagnetic wave signals used for communication), so the transmission distance of the electromagnetic wave signal in underwater environments is much smaller than that in air, and the higher the frequency of the electromagnetic wave, the stronger the absorbing ability of water, and the shorter the transmission distance. At present, underwater communication includes sound waves (vibration wave and other mechanical waves), electrical signal (wired cable) connection, high-power and short-distance electromagnetic communication, etc. For underwater communication of high frequency and low power electromagnetic waves (WIFI, Bluetooth, etc.), especially underwater synchronous transmission of images (photos and videos), although in theory, the communication may be achieved by making communication terminals very close to each other, such a manner is almost not practical due to the limit of shape and structure between the terminals and poor operation.

The effective transmission distance of commonly used wireless electromagnetic wave signals (such as a communication base station signal, a WIFI signal and a Bluetooth signal) under water is only about 10 cm, beyond which data cannot be transmitted effectively. Therefore, in an electromagnetic shielding environment like underwater, how to communicate with a large amount of information (such as pictures and videos) has become an urgent technical problem to be solved and a technical direction to be improved in the industry.

SUMMARY

To overcome the shortcomings of the conventional art, the present invention aims to provide a bridging transmission device for underwater wireless signals, which has high universality and good waterproof performance, and can improve the underwater transmission distance and transmission rate of wireless signals.

To solve the above problem, the technical solutions of the present invention are as follows. A bridging transmission device for underwater wireless signals is provided, which includes two conversion assemblies and a coaxial cable. Each of the conversion assemblies includes a waterproof protection shell and a conversion antenna installed in the waterproof protection shell. The conversion antenna can convert an electromagnetic wave signal and a weak electric signal to each other. Two ends of the coaxial cable are respectively inserted into the waterproof protection shells, and electrically connected with the conversion antennas respectively. The coaxial cable can transmit the weak electric signal.

Compared to the conventional art, the present invention has the following beneficial effects.

First, the transmission device transmits and converts wireless signals by means of signal bridging between two or among more independent intelligent terminal devices, each group of conversion antennas can perform bidirectional conversion of an electromagnetic waive signal and a weak electric signal many times, and the underwater transmission of the weak electric signal is performed through the coaxial cable, so the remote transmission of underwater wireless signals can be achieved by organically combining the characteristics of the coaxial cable and the wireless signals;

second, the conversion assembly can be connected to the intelligent terminal device without an interface, so the waterproof requirement can be easily met, and the cost, can be reduced; at the same time, the transmission device can be applied to a variety of intelligent terminal devices without considering the problem of inconsistent interface standards, so that the transmission device has high universality;

third, the two groups of conversion antennas connected to the two ends of the coaxial cable can achieve the bidirectional conversion from the electromagnetic wave signal to the weak electric signal and then from the weak electric signal to the electromagnetic wave signal many times, which can bring brand new experience to users, expand the application range of products, and have strong market competitiveness;

fourth, in the process of wireless signal transmission, the underwater transmission of the wireless signals can be achieved without supplying power to the coaxial cable and the conversion antenna, so a risk of leakage is not easy to happen, and the operation is more safe and reliable; and fifth, the coaxial cable has the advantages of strong interference immunity and small attenuation of electrical signal transmission, so the transmission distance of the weak electric signal can be lengthened, the remote transmission of the underwater wireless signals can be achieved, and the transmission rate and efficiency of the wireless signals can be improved.

In the bridging transmission device for underwater wireless signals, both the two ends of the coaxial cable are provided with an inner conductor, an inner insulating layer, an outer conductor and an outer insulating layer from inside to outside, the conversion antenna has pole A and pole B, and the pole A and the pole B of the conversion, antenna, are electrically connected with the inner conductor and the outer conductor respectively.

In the bridging transmission device for underwater wireless signals, the outer conductor is cylindric and coated on the periphery of the inner insulating layer, the outer conductor has a linear connection part, and the linear connection part is electrically connected with the pole B of the conversion antenna.

In the bridging transmission device for underwater wireless signals, the conversion assembly also includes a base, the base is fixedly connected in the waterproof protection shell, and the pole A and the pole B of the conversion antenna are both attached to the inner surface of the base.

In the bridging transmission device for underwater wireless signals, the outer surface of the base is close to or attached to the inner surface of the waterproof protection shell, and the base is made of an insulating material.

In the bridging transmission device for underwater wireless signals, the joint of the coaxial cable and the waterproof protection shell is provided with a sealing element, and the sealing element is attached to the outer surface of the coaxial cable and the inner surface of the waterproof protection shell.

In the bridging transmission device for underwater wireless signals, the sealing element is a sealing ring or a viscous sealant.

In the bridging transmission device for underwater wireless signals, there is a seal chamber inside the waterproof protection shell, the seal chamber is enclosed by the inner surface of the waterproof protection shell and the outer surface of the end of the coaxial cable, and the conversion antenna, the inner conductor and the outer conductor are in the seal chamber.

In the bridging transmission device for underwater wireless signals, the seal chamber is filled with waterproof sealant, and the waterproof sealant is made of an insulating material.

In the bridging transmission device for underwater wireless signals, the outer surface of the waterproof protection shell is connected with an intelligent terminal device through a fixing mechanism.

The present invention is further described in detail below in combination with the accompanying drawings and the specific implementation modes.

Figure 1:
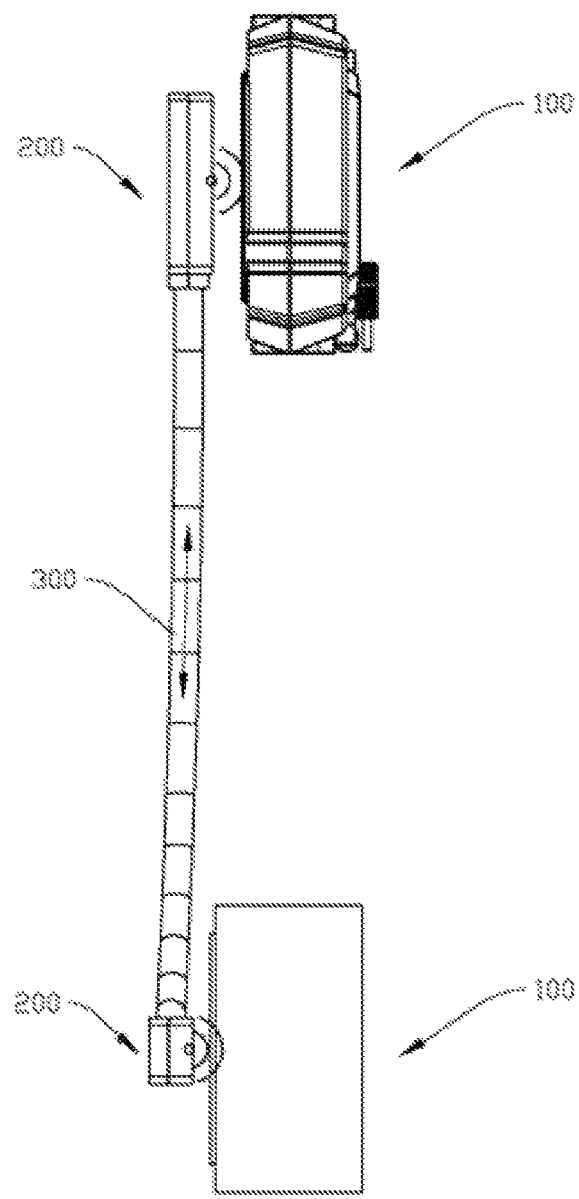
FIG. 1 is a first structural schematic diagram of lap joint between a transmission device and an intelligent terminal device according to an embodiment of the present invention.
Figure 2:
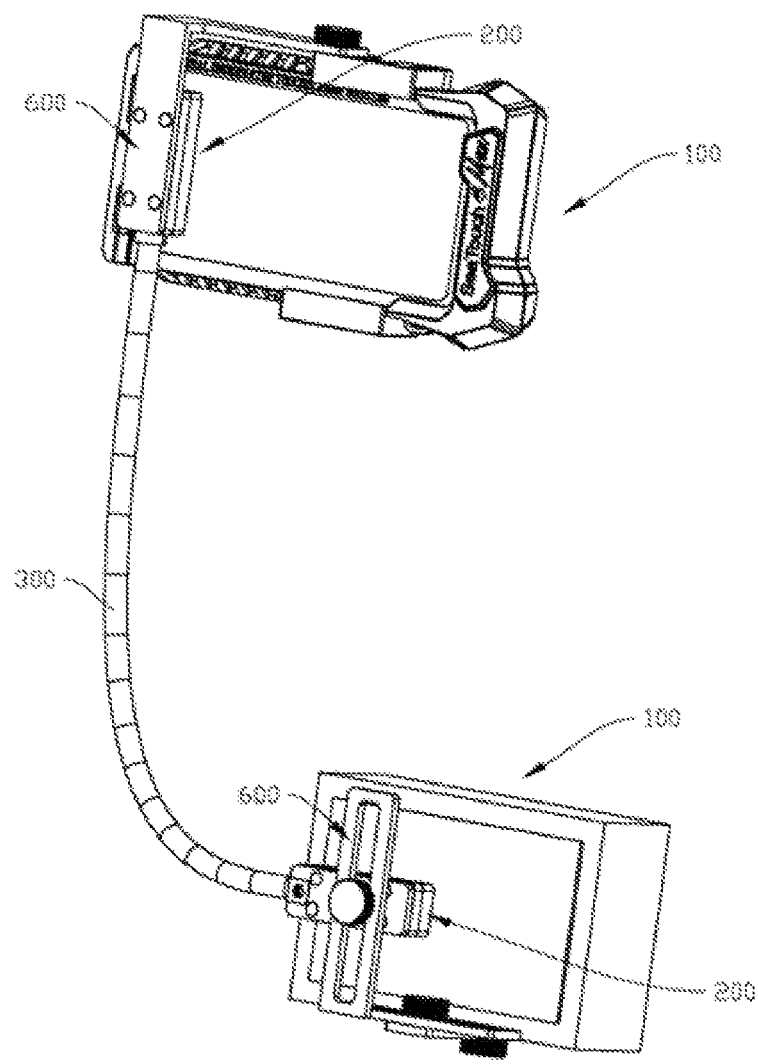
FIG. 2 is a second structural schematic diagram of lap joint between a transmission device and an intelligent terminal device according to an embodiment of the present invention.

Reference signs in the accompanying drawings: 100 represents an intelligent terminal device; 200 represents a conversion assembly; 210 represents a waterproof protection shell; 220 represents a conversion antenna; 221 represents pole A, 222 represents pole B, 230 represents a base; 300 represents a coaxial cable; 310 represents an inner conductor; 320 represents an inner insulating layer; 330 represents an outer conductor; 331 represents a linear connection part; 340 represents an outer insulating layer; 400 represents a sealing element 500 represents a seal chamber; and 600 represents a fixing mechanism.

DETAILED DESCRIPTION OF THE EMBODIMENTS

Embodiments of the present invention are described in detail below. With reference to FIG. 1 to FIG. 5, the embodiments of the present invention provide a bridging transmission device for underwater wireless signals, which includes a coaxial cable 300 and two conversion assemblies 200. Each of the conversion assemblies 200 includes a waterproof protection shell 210 and a conversion antenna 220 installed in the waterproof protection shell 210. The conversion antenna 220 can convert an electromagnetic wave signal and a weak electric signal to each other. Two ends of the coaxial cable 300 are respectively inserted into a group of waterproof protection shells 210, and electrically connected with a group of conversion antennas 220 respectively. The coaxial cable 300 can transmit the weak electric signal.

The transmission device transmits and converts wireless signals by means of signal bridging between two or among more independent intelligent terminal devices 100, each group of conversion antennas 220 can perform bidirectional conversion of an electromagnetic wave signal and a weak electric signal many times, and the underwater transmission of the weak electric signal is performed through the coaxial cable 300, so the remote transmission of underwater wireless signals can be achieved by organically combining the characteristics of the coaxial cable 300 and the wireless signals. Because the conversion antenna 220 can achieve the mutual conversion between the electromagnetic wave, signal and the weak electric signal, when the wireless signal is transmitted using the transmission device, there is no need to wire the conversion assembly 200 to the intelligent terminal device 100, but it is only necessary to place the conversion assembly 200 near the intelligent terminal device 100, or mechanically install the conversion assembly 200 on, the intelligent terminal device 100. For example, with reference to FIG. 2, a screw hole may be made on the outside of the waterproof protection shell 210 to facilitate the installation of a connector or clamp and other fixing mechanisms 600 on the outside of the waterproof protection shell 210, thus the conversion assembly 200 is fixedly connected to the intelligent terminal device 100, so that the conversion assembly 200 always keeps close to and relatively fixed with the intelligent terminal device 100 during use, so as to receive or send the electromagnetic wave signal.

In the transmission device, the conversion antenna 220 used may be a patch antenna. When the resonant frequency of the conversion antenna 220 matches the received electromagnetic wave signal, the conversion antenna 220 will convert the received electromagnetic wave signal to a corresponding high-frequency current (namely the weak electric signal). On the contrary, when receiving a high-frequency current, the conversion antenna 220 may also convert the high-frequency current to the electromagnetic wave signal of the corresponding frequency for radiation outward. Therefore, the two groups of conversion antennas 200 connected to the two ends of the coaxial cable 300 can achieve the bidirectional conversion from the electromagnetic wave signal to the weak electric signal and then from the weak electric signal to the electromagnetic wave signal many times, which can bring, brand new experience to users, expand the application range of products, and have strong market competitiveness.

In the transmission device, the conversion assembly 200 can be connected to the intelligent terminal device 100 without an interface, so the waterproof requirement can be easily met, and the cost can be reduced; at the same time, the transmission device can be applied to a variety of intelligent terminal devices 100 without considering the problem of inconsistent interface standards, so that the transmission device has high universality. In the process of wireless signal transmission, the underwater transmission of the wireless signals can be achieved without supplying power to the coaxial cable 300 and the conversion antenna 220, so a risk of leakage is not easy to happen, and the operation is more safe and reliable. The coaxial cable 300 has the advantages of strong interference immunity and small attenuation of electrical signal transmission, so the transmission distance of the weak electric signal can be lengthened, the remote transmission of the underwater wireless signals can be achieved, and the transmission rate and efficiency of the wireless signals can be improved.

Taking the transmission of the wireless signals between two intelligent terminal devices 100 as an example, both a professional underwater SLR camera and a professional underwater mobile phone belong to the intelligent terminal devices 100, however, because the underwater environment is an electromagnetic shielding environment, a WIFI association between the professional underwater SLR camera and the professional underwater mobile phone cannot be realized. In this case, the transmission device can be used, and the two conversion assemblies 200 are fixed to the professional underwater SLR camera and the professional underwater mobile phone respectively. When the professional underwater SLR camera emits an electromagnetic wave signal, the conversion antenna 220 near it can sense the electromagnetic wave signal and convert the electromagnetic wave signal to a high-frequency current of the corresponding frequency, and the coaxial cable 300 can transmit the high-frequency current to another group of conversion antennas 220. After receiving the high frequency current, this group of conversion antennas 220 will convert the high-frequency current to an electromagnetic wave signal of the corresponding frequency and radiate it outwards to be received by the professional underwater mobile phone, so as to realize the underwater WIFI association between the professional underwater SLR camera and the professional underwater mobile phone. It can be inferred from the above example that when there are two or multiple intelligent terminal devices 100, the transmission device may also be used to connect multiple intelligent terminal devices 100 in pairs, so as to realize WIFI sharing among the multiple intelligent terminal devices 100. Because there is no need to connect the conversion assembly 200 with the intelligent terminal device 100 through an interface, both iPhone and Android phone, or the intelligent terminal devices with other interfaces can be matched with the transmission device. Because the cost of the transmission device is low, under the premise of not spending too much cost, a wireless signal transmission system can be built by deploying multiple transmission devices in some underwater spaces, such as swimming pool, aquarium and diving area of some tourist attractions, thereby solving the problem that the signal is weak in the underwater space.

Figure 3:
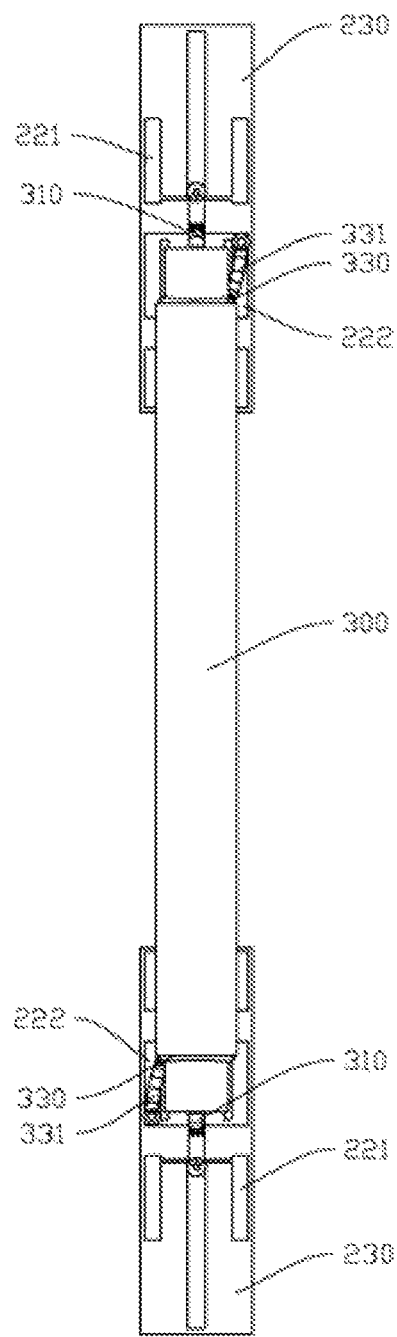
FIG. 3 is a structural schematic diagram of a transmission device according to an embodiment of the present invention.
Figure 4:
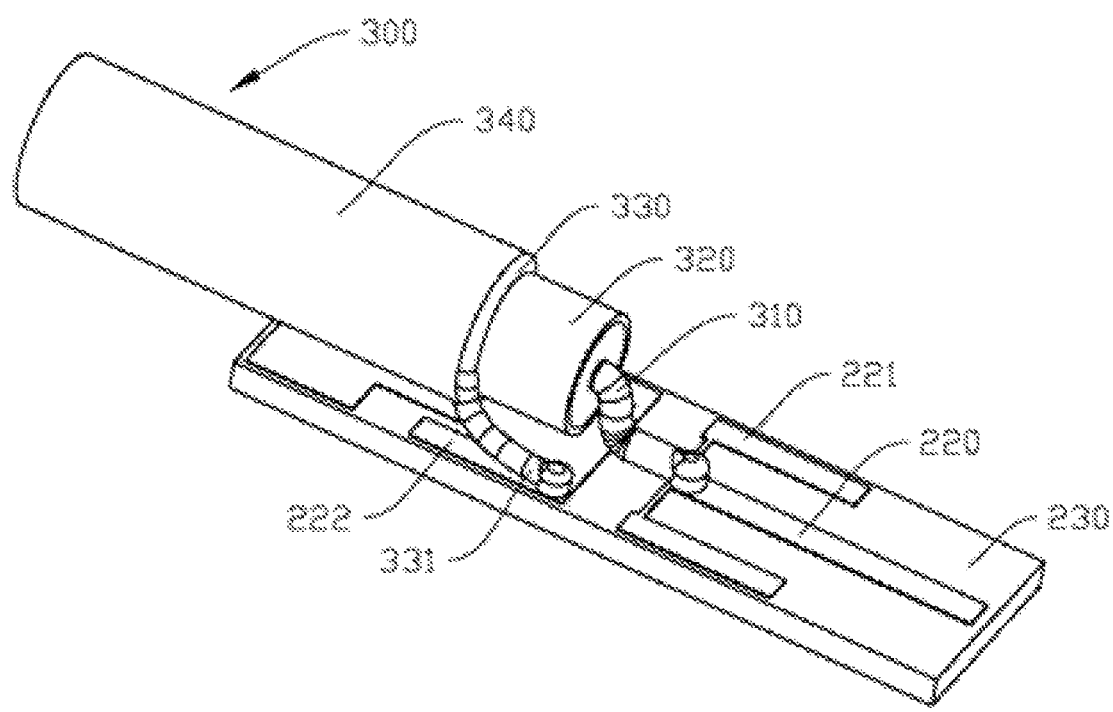
FIG. 4 is a first connection diagram of a coaxial, cable and a conversion assembly according to an embodiment of the present invention.

Further, with reference to FIG. 3 and FIG. 4, both the two ends of the coaxial cable 300 are provided with an inner conductor 310, an inner insulating, layer 320, an outer conductor 330 and an outer insulating layer 340 from inside to outside. The inner insulating layer 320 and the outer insulating layer 340 are made of an insulating material with good flexibility, strong aging resistance and corrosion resistance, for example, PVC or silicone rubber. The conversion antenna 220 has pole A 221 and pole B 222, and the pole A 221 and the pole B 222 of the conversion antenna 220 are electrically connected with the inner conductor 310 and the outer conductor 330 respectively.

It is understandable that the conversion antennas 220 in the two conversion assemblies 200 are connected with the coaxial cable 300 in the same way. That is, at one end of the coaxial cable 300, the pole A 221 and the pole B 222 of one conversion antenna 220 are electrically connected with the inner conductor 310 and the outer conductor 330 at this end of the coaxial cable 300 respectively. At the other end of the coaxial cable 300, the pole A 221 and the pole B 222 of the other conversion antenna 220 are electrically connected with the inner conductor 310 and the outer conductor 330 at this end of the coaxial cable 300 respectively.

Specifically, as shown in FIG. 4, the outer conductor 330 is cylindric and coated on the periphery of the inner insulating layer 320, the outer conductor 330 has a linear connection part 331, and the linear connection part 331 is electrically connected with the pole B 222 of the conversion antenna 220, so as to facilitate the connection between the outer conductor 330 and the pole B 222 of the conversion antenna 220. Specifically, the outer conductor 330 is at the end of the coaxial cable 300. At the end, the outer conductor 330 is twisted from a cylindrical shape to a linear shape, thus forming a linear connection part 331. Specifically, the pole A 221 and the pole B 222 of the conversion antenna 220 may be connected with the inner conductor 310 and the outer conductor 330 by, but not limited to, welding.

Figure 5:
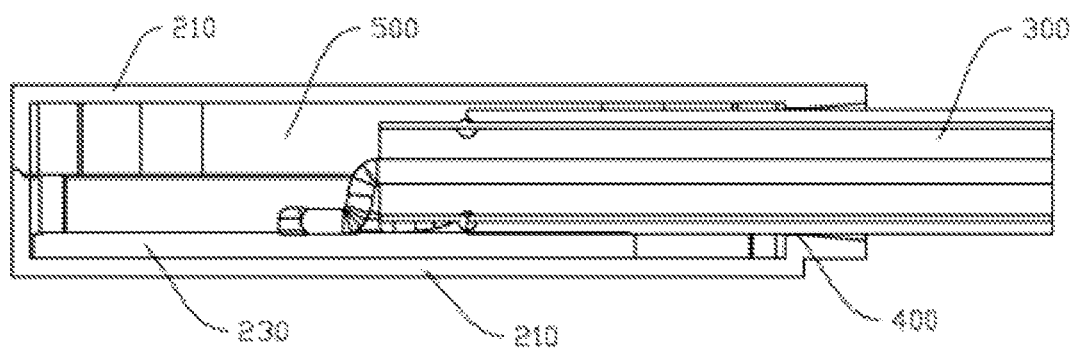
FIG. 5 is a second connection diagram of a coaxial cable and a conversion assembly according to an embodiment of the present invention.

Further, with reference to FIG. 4 and FIG. 5, the conversion assembly 200 also includes a base 230, the base 230 is fixedly connected in the waterproof protection shell 210, and the pole A 221 and the pole B 222 of the conversion antenna 220 are both attached to the inner surface of the base 230. Further, the outer surface of base 230 is close to or attached to the inner surface of the waterproof protection shell 210, and the base 230 is made of an insulating material. It is understandable that the inner surface of the base 230 refers to the side that is closer to the inner center of the waterproof protection shell 210, and the outer surface of the base 230 refers to the side that is closer to the outside of the waterproof protection shell 210.

Further, the joint of the coaxial cable 300 and the waterproof protection shell 210 is provided with a sealing element 400, and the sealing element 400 is attached to the outer surface of the coaxial cable 300 and the inner surface of the waterproof protection shell 210, which can prevent water from entering the inside of the waterproof protection shell 210 from the joint of the coaxial cable 300 and the waterproof protection shell 210. Specifically, the sealing element 400 may be a sealing, ring sheathed on the outer surface of the coaxial cable 300, of course, it may also be a viscous sealant coated on the outer surface of the coaxial cable 300 or the inner surface of the waterproof protection shell 210, that is, the coaxial cable 300 is fixedly connected with the waterproof protection shell 210 by means of adhesive while inserted into the waterproof protection shell 210.

Specifically, as shown in FIG. 5, there is a seal chamber 500 inside the waterproof protection shell 210, the seal chamber 500 is enclosed by the inner surface of the waterproof protection shell 210 and the outer surface of the end of the coaxial cable 300, the conversion antenna 220, the inner conductor 310 and the outer conductor 330 are all in the seal chamber 500, and the joint of the conversion antenna 220 and the inner conductor 310 and the outer conductor 330 is also in the seal chamber 500. Further, the seal chamber 500 is filled with waterproof sealant, and the waterproof sealant can completely coat the base 230, the inner insulating layer 320, the inner conductor 310, the outer insulating layer 340 and the outer conductor 330 of the coaxial cable 300 in the seal chamber, and the pole A 221 and the pole B 222 of the conversion antenna 220, so the waterproof performance is further improved, the manufacturing process is more convenient, and the cost is also low. Specifically, the waterproof sealant is made of an insulating material. After the waterproof sealant is filled into the seal chamber 500 and cured, the sealing element can be formed with strong viscosity and some flexibility.

The present invention solves the problem of short-distance transmission of high-frequency and low-power electromagnetic waves under water, can significantly lengthen the transmission distance of the high-frequency and low-power electromagnetic waves (WIFI, Bluetooth, etc.) underwater, so as to realize the normal communication of the high-frequency and low-power electromagnetic waves between underwater terminals, and has good operability. Moreover, the terminals are in a proximity connection, and there is no need to enter the terminals, so any terminal with waterproof ability is applicable, and the waterproof safety of the terminal will not be affected. Therefore, the present invention has excellent versatility and safety.

In the description of the present invention, "some" means one or more, "multiple" means two or more than two, "greater than", "less than" and "more than" are understood as excluding this number, and "above", "below" and "within" are understood as including this number. In the description of the present invention, unless otherwise expressly qualified, terms like set, install and connect should be understood in a broad sense, and, those skilled in the art can reasonably determine the specific meanings of the above terms in the present invention based on the specific contents of the technical solutions.

The above implementation modes are only the preferred implementation modes of the present invention and shall not limit the scope of protection of the present invention. Any immaterial changes and replacements made by those skilled in the art on the basis of the present invention shall fall within the scope of protection claimed by the present invention.

What is claimed is:

1. A bridging transmission device for underwater wireless signals, comprising:
   two conversion assemblies (200), wherein each of the conversion assemblies (200) comprises a waterproof protection shell (210) and a conversion antenna (220) installed in the waterproof protection shell (210), and the conversion antenna (220) can convert an electromagnetic wave signal and a weak electric signal to each other; and
   a coaxial cable (300), wherein two ends of the coaxial cable (300) are respectively inserted into the waterproof protection shells (210), and electrically connected with the conversion antennas (220) respectively, and the coaxial cable (300) can transmit the weak electric signal.

2. The bridging transmission device for underwater wireless signals as claimed in claim 1, wherein both the two ends of the coaxial cable (300) are provided with an inner conductor (310), an inner insulating layer (320), an outer conductor (330) and an outer insulating layer (340) from inside to outside, the conversion antenna (220) has pole A (221) and pole B (222), and the pole A (221) and the pole B (222) of the conversion antenna (220) are electrically connected with the inner conductor (310) and the outer conductor (330) respectively.

3. The bridging transmission device for underwater wireless signals as claimed in claim 2, wherein the outer conductor (330) is cylindric and coated on the periphery of the inner insulating layer (320), the outer conductor (330) has a linear connection part (331), and the linear connection part (331) is electrically connected with the pole B (222) of the conversion antenna (220).

4. The bridging transmission device for underwater wireless signals as claimed in claim 2, wherein the conversion assembly (200) also comprises a base (230), the base (230) is fixedly connected in the waterproof protection shell (210), and the pole A (221) and the pole B (222) of the conversion antenna (220) are both attached to the inner surface of the base (230).

5. The bridging transmission device for underwater wireless signals as claimed in claim 4, wherein the outer surface of the base (230) is close to or attached to the inner surface of the waterproof protection shell (210), and the base (230) is made of an insulating material.

6. The bridging transmission device for underwater wireless signals as claimed in claim 2, wherein the joint of the coaxial cable (300) and the waterproof protection shell (210) is provided with a sealing element (400), and the sealing element (400) is attached to the outer surface of the coaxial cable (300) and the inner surface of the waterproof protection shell (210).

7. The bridging transmission device for underwater wireless signals as claimed in claim 6, wherein the sealing element (400) is a sealing ring or a viscous sealant.

8. The bridging transmission device for underwater wireless signals as claimed in claim 6, wherein there is a seal chamber (500) inside the waterproof protection shell (210), the seal chamber (500) is enclosed by the inner surface of the waterproof protection shell (210) and the outer surface of the end of the coaxial cable (300), and the conversion antenna (220), the inner conductor (310) and the outer conductor (330) are in the seal chamber (500).

9. The bridging transmission device for underwater wireless signals as claimed in claim 8, wherein the seal chamber (500) is filled with waterproof sealant, and the waterproof sealant is made of an insulating material.

10. The bridging transmission device for underwater wireless signals as claimed in claim 1, wherein the outer surface of the waterproof protection shell (210) is connected with an intelligent terminal device (100) through a fixing mechanism (600).

* * * * *